(12) United States Patent
Stebnicki et al.

(10) Patent No.: US 7,132,167 B2
(45) Date of Patent: Nov. 7, 2006

(54) COMPOSITE ARTICLE HAVING THERMOPLASTIC ELASTOMER REGION ON THERMOPLASTIC SUBSTRATE

(75) Inventors: James C. Stebnicki, Glendale, WI (US); Thomas R. Buchholz, Grafton, WI (US)

(73) Assignee: Rexnord Corporation, Milwaukee, WI (US)

( * ) Notice: Subject to any disclaimer, the term of this patent is extended or adjusted under 35 U.S.C. 154(b) by 95 days.

(21) Appl. No.: 10/628,932

(22) Filed: Jul. 29, 2003

(65) Prior Publication Data

US 2005/0074620 A1 Apr. 7, 2005

Related U.S. Application Data

(60) Provisional application No. 60/414,312, filed on Sep. 27, 2002.

(51) Int. Cl.
B32B 27/36 (2006.01)

(52) U.S. Cl. .................. 428/412; 264/176.1; 264/219; 428/411.1; 525/66.67

(58) Field of Classification Search ............. 264/176.1, 264/219; 428/411.1, 412; 525/66, 67
See application file for complete search history.

(56) References Cited

U.S. PATENT DOCUMENTS

| | | | |
|---|---|---|---|
| 2,929,800 A | 3/1960 | Hill, Jr. | |
| 2,948,691 A | 8/1960 | Windemuth et al. | |
| 3,620,905 A | 10/1969 | Ahramjian | |
| 3,642,964 A | 12/1969 | Rausch, Jr. et al. | |
| 3,493,634 A | 2/1970 | Kolycheck | |
| 3,649,143 A | 3/1972 | Papesh et al. | |
| 3,963,679 A | 6/1976 | Ullrich et al. | |
| 4,010,235 A | 3/1977 | Yardley et al. | |
| 4,054,403 A | 10/1977 | Hornbeck et al. | |
| 4,076,891 A | 2/1978 | Yardley et al. | |
| 4,131,604 A | 12/1978 | Szycher | |
| 4,169,196 A | 9/1979 | Ehrlich et al. | |
| 4,245,081 A | 1/1981 | Quiring et al. | |
| 4,371,684 A | 2/1983 | Quiring et al. | |
| 4,379,904 A | 4/1983 | Ehrlich et al. | |
| 4,385,025 A | 5/1983 | Salerno et al. | |
| 4,405,547 A | 9/1983 | Koch et al. | |
| 4,447,590 A | 5/1984 | Szycher | |
| RE31,671 E | 9/1984 | Bonk et al. | |
| 4,523,005 A | 6/1985 | Szycher | |
| 4,621,113 A | 11/1986 | Collins | |
| 4,631,329 A | 12/1986 | Gornowicz et al. | |
| 4,674,622 A | 6/1987 | Utsunomiya et al. | |
| 4,772,006 A | 9/1988 | Guglielmetti et al. | |
| 5,316,132 A | 5/1994 | Muraoka et al. | |
| 5,354,532 A | 10/1994 | Nakai et al. | |
| 5,579,944 A | 12/1996 | Hafner et al. | |
| 5,637,407 A | 6/1997 | Hert et al. | |
| 5,870,799 A | 2/1999 | Benda | |
| 6,071,454 A | 6/2000 | Shimizu et al. | |
| 6,117,176 A * | 9/2000 | Chen ........................ | 623/36 |
| 6,136,249 A | 10/2000 | Takeuchi et al. | |
| 6,159,409 A | 12/2000 | Benda | |
| 6,383,654 B1 | 5/2002 | Yabe et al. | |
| 6,419,869 B1 | 7/2002 | Gotterbauer et al. | |
| 2004/0028907 A1 * | 2/2004 | Wang ........................ | 428/412 |

FOREIGN PATENT DOCUMENTS

| | | |
|---|---|---|
| CA | 1231666 | 1/1988 |
| EP | 521245 A1 | 1/1993 |
| EP | 656388 A1 | 6/1995 |
| WO | WO 97/19995 A1 | 6/1997 |

OTHER PUBLICATIONS

Derwent Abstract for CA 1231666.
PCT Search Report for PCT/US03/30343.

* cited by examiner

*Primary Examiner*—Terressa Boykin
(74) *Attorney, Agent, or Firm*—Quarles & Brady LLP

(57) ABSTRACT

A method and materials are disclosed wherein a layer of a softer thermoplastic material comprising (i) a thermoplastic polyurethane or (ii) a thermoplastic elastomer alloy including a styrenic thermoplastic elastomer and a thermoplastic polyurethane can be attached to a substrate comprising a harder thermoplastic alloy including a polyester and a polycarbonate. In one form, the method and materials are used to form a modular chain link for use in constructing a modular conveyor chain. The modular chain link includes a main body comprising the thermoplastic alloy including a polyester and a polycarbonate, and a softer layer of the thermoplastic material comprising (i) a thermoplastic polyurethane or (ii) a thermoplastic elastomer alloy including a styrenic thermoplastic elastomer and a thermoplastic polyurethane disposed on at least a portion of the main body.

51 Claims, 1 Drawing Sheet

COMPOSITE ARTICLE HAVING THERMOPLASTIC ELASTOMER REGION ON THERMOPLASTIC SUBSTRATE

CROSS REFERENCE TO RELATED APPLICATIONS

This application claims priority from U.S. Provisional Patent Application No. 60/414,312, filed Sep. 27, 2002.

STATEMENT REGARDING FEDERALLY SPONSORED RESEARCH

Not Applicable.

BACKGROUND OF THE INVENTION

It is often desirable to manufacture a single component which has the hardness and frictional properties of a thermoplastic elastomeric material in one region and the hardness and frictional properties of another thermoplastic material in other regions. For example, the thermoplastic elastomeric material may provide functions such as a built in gasket, or soft grip for "non-slip" handling, or skid free standing plane, or a high friction top to a modular belt or conveyor chain. The harder thermoplastic material can provide structure or mechanical strength to the component. In one example application, a thermoplastic elastomer, such a styrenic block copolymer, is laminated to a hard resin. The laminate is advantageous since it has a good feel, shock absorption (cushionability) and damage-resistance because of the flexibility and elasticity of the layer of the thermoplastic elastomer and has shape-retaining and reinforcing ability because of the hard resin.

While composites of a thermoplastic elastomer and a hard resin often have advantageous properties, it may be difficult to create an acceptable bond between the thermoplastic elastomer and the hard resin. Often mechanical coupling methods must be employed in which the thermoplastic elastomer and the hard resin are formed to have engaging means capable of being coupled together. However, the formation of engaging means typically require molds with complicated structures for forming the engaging means. Alternatively, the thermoplastic elastomer and the hard resin are often bonded together with some other bonding means, such as adhesives. The use of adhesives is also undesirable because it requires complicated steps to prepare the two layers followed by bonding. As a result, poorly-bonded composites are often produced, and organic solvents in adhesives often are detrimental in the working environment.

What is needed therefore is a method and materials wherein a thermoplastic elastomeric material can be readily molded to another harder thermoplastic material such that an acceptable bond forms between the thermoplastic elastomer and the harder thermoplastic material.

SUMMARY OF THE INVENTION

The present invention provides a formulation to attach a thermoplastic material comprising a thermoplastic urethane to a thermoplastic alloy of a polyester and a polycarbonate. In one form, the thermoplastic material includes a styrenic thermoplastic elastomer and the thermoplastic urethane. Molded components can be manufactured using an alloy blend of a polyester and a polycarbonate. Components can then be manufactured which include a significant bond between the thermoplastic alloy of a polyester and a polycarbonate and the thermoplastic material. The materials can be attached by a process such as injection molding, extrusion, or another process known in the art for processing thermoplastics including multi-barrel injection molding and co-extrusion.

One advantage of the invention is to attach a relatively soft thermoplastic material, such as a thermoplastic elastomer, to a significantly harder thermoplastic material. This is advantageous in that a single component can be manufactured which has properties of the soft material in one region or part feature and the properties of the harder material in other regions or part features. The soft material may provide function such as a built in gasket, or soft grip for "non-slip" handling, or skid free standing plane, or a high friction top to a modular belt or conveyor chain, etc. The hard material can provide structure or mechanical strength to name a few features.

These and still other advantages of the present invention will be apparent from the description which follows. In the detailed description below, preferred embodiments of the invention will be described. These embodiments do not represent the full scope of the invention. Rather the invention may be employed in other embodiments. Reference should therefore be made to the claims herein for interpreting the breadth of the invention.

DETAILED DESCRIPTION OF THE INVENTION

Figure 1:
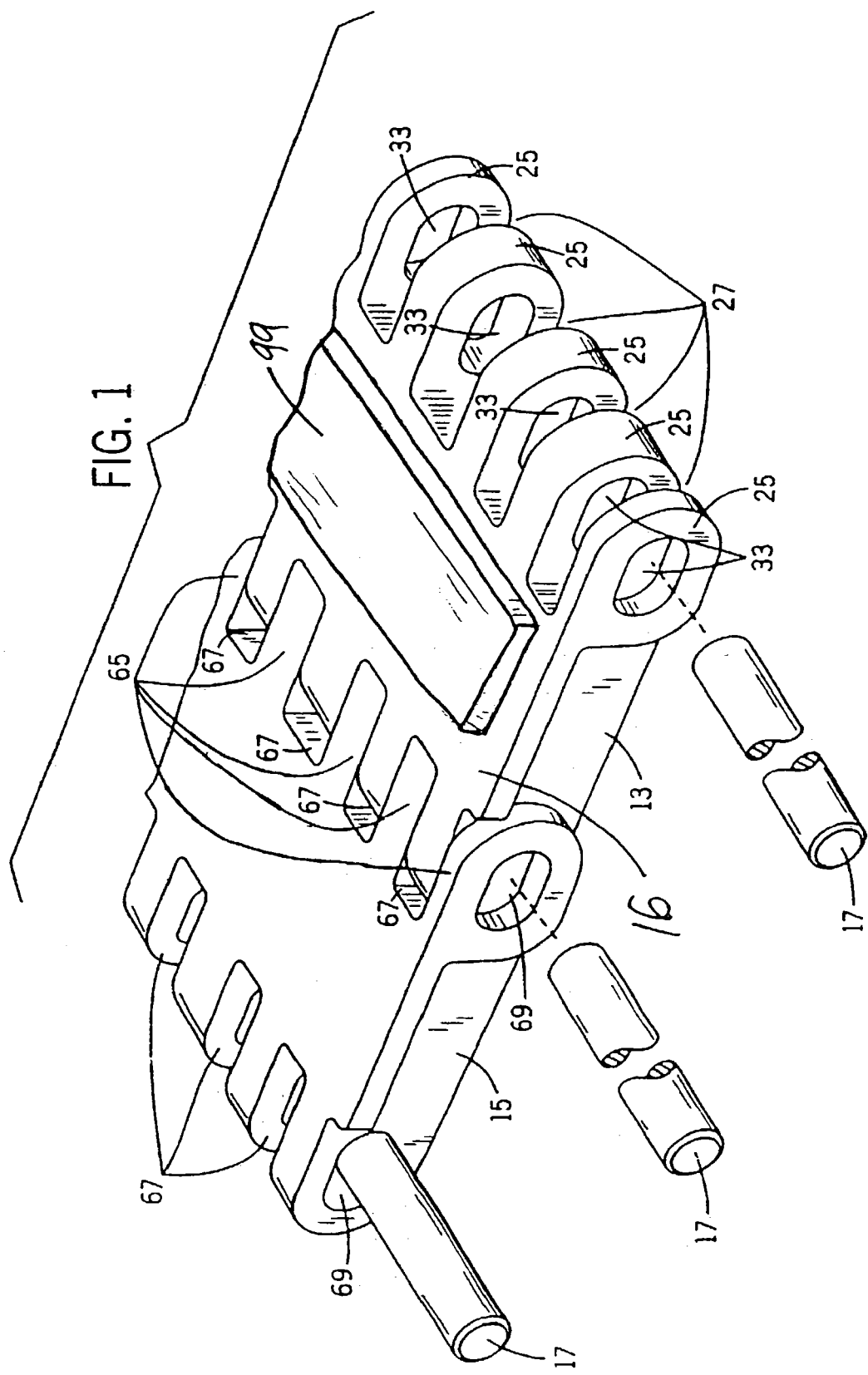
FIG. 1 is an exploded perspective view of a portion of a modular conveyor chain including a modular chain link formed using the present invention.

The present invention provides a method for attaching a softer thermoplastic material to a harder thermoplastic material. In one embodiment, a thermoplastic material comprising a thermoplastic polyurethane can be attached to a thermoplastic alloy of a polyester and a polycarbonate. In another embodiment, a thermoplastic elastomer alloy including a styrenic thermoplastic elastomer and a thermoplastic polyurethane can be attached to a thermoplastic alloy of a polyester and a polycarbonate. The materials can be attached by a process such as injection molding, extrusion, or another process known in the art for processing thermoplastics including multi-barrel injection molding and co-extrusion. For example, one material can be injection molded (by insert molding or 2-shot), extruded (or co-extruded) or thermally processed in some manner which allows the second material to bond thermally or chemically.

In one form, the invention provides a molded article including a substrate comprising a thermoplastic alloy including a polyester and a polycarbonate, and a layer of a thermoplastic material disposed on at least a portion of the substrate. The thermoplastic material may comprise a thermoplastic polyurethane, or a thermoplastic elastomer alloy including a styrenic thermoplastic elastomer and the thermoplastic polyurethane. Optionally, the thermoplastic material may consist essentially of the thermoplastic polyurethane. Optionally, the thermoplastic elastomer alloy may consist essentially of the styrenic thermoplastic elastomer and the thermoplastic polyurethane.

The styrenic thermoplastic elastomer is preferably a styrenic block copolymer. Non-limiting examples of styrenic block copolymers include styrene-butadiene-styrene (SBS) copolymers, styrene-isoprene-styrene (SIS) copolymers, styrene-ethylene/butylene-styrene (SEBS) copolymers, and styrene-ethylene/propylene-styrene (SEPS) copolymers. In one example form of the invention, the styrenic block copolymer is selected from styrene-ethylene/butylene-styrene copolymers.

The polyurethane has no limitation in respect of its formulation other than the requirement that it be thermoplastic in nature. Such thermoplastic polyurethane compositions are generally referred to as TPU materials, and any TPU materials that are compatible with the styrenic thermoplastic elastomer can be used in the thermoplastic elastomer alloy of the present invention. For particular teachings on various TPU materials and their preparation, see U.S. Pat. Nos. 2,929,800; 2,948,691; 3,493,634; 3,620,905; 3,642,964; 3,963,679; 4,131,604; 4,169,196; Re 31,671; U.S. Pat. Nos. 4,245,081; 4,371,684; 4,379,904; 4,447,590; 4,523,005; 4,621,113; and 4,631,329 whose disclosures are hereby incorporated herein by reference.

Thermoplastic elastomer alloys including a styrenic thermoplastic elastomer and a thermoplastic polyurethane are commercially available. One preferred thermoplastic elastomer alloy for use in the present invention is an SEBS/Urethane TPE/TPU alloy sold under the designation Versaflex™ OM 1245X-1 by GLS Corporation, McHenry, Ill., USA. When attached to the thermoplastic alloy substrate, the thermoplastic elastomer alloy has a hardness in the range of 40–70 Shore A as measured using the procedures of ASTM D2240. The hardness selected for the thermoplastic elastomer alloy is typically lower than that of the thermoplastic alloy substrate.

The polyester used in the thermoplastic alloy comprising the substrate is typically the reaction product of a polyhydric alcohol and a polycarboxylic acid. For example, the polyester may be the reaction product of an alkanediol and terephthalic acid. Preferably, the polyester is selected from polyethylene terephthalate and polybutylene terephthalate, and most preferably, the polyester is polybutylene terephthalate.

The polycarbonate used in the thermoplastic alloy comprising the substrate is typically is a bisphenol-A polycarbonate. Most preferably, the polycarbonate is the reaction product of bisphenol-A and diphenyl carbonate.

Thermoplastic alloys including a polyester and a polycarbonate are commercially available. Several preferred thermoplastic alloys for use in the substrate of the present invention are sold under the designation Xenoy™ by General Electric Plastics, Pittsfield, Mass., USA. One preferred thermoplastic alloy for use in the substrate of the present invention is sold under the designation Xenoy™ 1200 and comprises an alloy of polybutylene terephthalate (PBT) and a bisphenol-A polycarbonate (PC). Typically, the bisphenol-A polycarbonate is the reaction product of bisphenol-A and a carbonate diester such as diphenyl carbonate.

The thermoplastic material comprising a thermoplastic polyurethane, or the thermoplastic material comprising a thermoplastic elastomer alloy including a styrenic thermoplastic elastomer and the thermoplastic polyurethane may be attached to the thermoplastic alloy substrate using conventional methods. The materials can be attached by a process such as injection molding, extrusion, or another process known in the art for processing thermoplastics including multi-barrel injection molding and co-extrusion. Examples of co-extrusion methods and equipment can be found in U.S. Pat. Nos. 4,405,547, 4,054,403 and 3,649,143 which are incorporated herein by reference. In an injection molding process, an article having thermoplastic elastomer alloy and the thermoplastic material laminated layers is constructed by first injection molding the hard thermoplastic alloy into a suitable mold, and then forming an outer surface portion by injecting the soft thermoplastic material onto a portion of the hard thermoplastic alloy. Another method comprises constructing each of the layers separately, and one surface of the soft thermoplastic material portion is then fastened by cementing (e.g., by an adhesive) to the complementing surface of the hard thermoplastic alloy. In the version of the invention using a thermoplastic material comprising a thermoplastic elastomer alloy including a styrenic thermoplastic elastomer and the thermoplastic polyurethane, there may be a significant advantage to having either the styrenic thermoplastic elastomer phase or the thermoplastic polyurethane phase of the thermoplastic elastomer alloy as large as possible in order to increase the bond strength with the substrate.

With respect to the substrate, polycarbonates may not be a very good material for making certain components. For instance, polycarbonates are not very good materials for making conveyor chain or modular belting. Polycarbonate is an amorphous material which does not have very good mechanical properties, especially fatigue resistance, which is required for a conveyor chain application. Polybutylene terephthalate; however, is highly crystalline and is well known to be a good chain material. Thus, there may be a significant advantage to having either the polyester phase or the polycarbonate phase in the thermoplastic alloy as large as possible. In the thermoplastic alloy of a polyester and a polycarbonate, it is recognized that increasing the amount of polycarbonate may significantly reduce the mechanical properties of the material. However, adjusting the block length of the polycarbonate in the thermoplastic alloy of the polyester and the polycarbonate may allow a larger region for the polycarbonate phase in the thermoplastic alloy to attach to the thermoplastic material. Likewise, larger polycarbonate regions or phases in the thermoplastic alloy of a polyester and a polycarbonate may allow for better places to attach to the thermoplastic urethane or the thermoplastic urethane of the thermoplastic elastomer alloy.

In one application, one or more of the modular chain links of a modular conveyor chain can be formed using the present invention. A portion of a modular conveyor chain is shown in FIG. 1. A modular chain link 13 formed using the present invention is shown intermeshed with a conventional adjacent chain link 15. A connector pin 17 pivotally connects the chain link 13 with the adjacent chain link 15.

The chain link 13 includes a link body 16 and a layer 99 disposed on the top of the link body 16 The link body 16 is formed from any of the thermoplastic alloy substrate materials described above such as the materials including a polyester and a polycarbonate. A preferred thermoplastic alloy for use in the link body 16 is sold under the designation Xenoy™ 1200 and comprises an alloy of polybutylene terephthalate (PBT) and a bisphenol-A polycarbonate (PC). Typically, the bisphenol-A polycarbonate is the reaction product of bisphenol-A and a carbonate diester such as diphenyl carbonate. The top layer 99 is formed from any of the thermoplastic materials described above such as the materials including a thermoplastic polyurethane or a styrenic thermoplastic elastomer and a thermoplastic polyurethane. One preferred thermoplastic material for use in the top layer 99 is an SEBS/Urethane TPE/TPU alloy sold under the designation Versaflex™ OM 1245X-1 by GLS Corporation, McHenry, Ill., USA. The link body 16 and the top layer 99 may be attached using the conventional methods (i.e., injection molding, extrusion, cementing) described above. When attached to the link body 16, the top layer 99 has a hardness in the range of 40–70 Shore A as measured using the procedures of ASTM D2240. The hardness selected for the top layer 99 is typically lower than that of the link body 16.

The link body 16 includes a series of link ends 25 extending from opposite sides of the link body 16. The link ends 25 are transversely spaced from each other to define therebetween a series of spaces 27. The series of link ends 25 include openings 33 that are axially aligned with respect to each other. The openings 33 in the link ends 25 can be cylindrical or elongated in the direction of travel of the modular conveyor belt.

The adjacent chain link 15 is preferably the same general shape as the chain link 13. The adjacent chain link 15 also includes a series of link ends 65 that are axially spaced from each other to define a series of spaces 67. The series of spaces 67 are adapted to receive the series of link ends 25 located on one side of the chain link 13. The link ends 65 extend into the spaces 27 between the link ends 25 of the chain link 13. The link ends 65 in the adjacent link 15 also include openings 69 that are axially aligned with respect to each other as well as the openings 33 in chain link 13 when the adjacent link 15 is assembled to the chain link 13. The openings 69 may be cylindrical or elongated in the travel direction of the modular conveyor chain.

EXAMPLE

Experiments were conducted with bonding a thermoplastic elastomer alloy (SEBS/Urethane TPE/TPU) sold under the designation Versaflex™ OM 1245X-1 by GLS Corporation, McHenry, Ill., USA and a thermoplastic alloy sold under the designation Xenoy™ 1200, which comprises an alloy of polybutylene terephthalate (PBT) and a bisphenol-A polycarbonate (PC). The results were very positive in that they showed good adhesion between these two materials. Thus, it is possible to chemically bond a SEBS/Urethane based TPE/TPU alloy to a polycarbonate/PBT substrate. It is known that PC/PBT alloys have some unique properties which have a wide variety of applications. Alloying PC and PBT bring chemical resistance, thermal stability, and mechanical properties from the crystalline PBT component along with the toughness of the PC component. Bonding a soft material to this alloy has market value not only for conveyor chains, but also for a wide variety of other products such as power tool housings, automotive components, household appliances, and the like.

Therefore, the present invention provides a method and materials wherein a softer thermoplastic material can be readily molded to another harder thermoplastic material such that an acceptable bond forms between the softer thermoplastic material and the harder thermoplastic material. In particular, the invention provides a method and materials wherein a layer of a thermoplastic material comprising a thermoplastic polyurethane or a thermoplastic elastomer alloy including a styrenic thermoplastic elastomer and a thermoplastic polyurethane can be attached to a substrate comprising a thermoplastic alloy including a polyester and a polycarbonate.

While there has been shown and described what are at present considered the preferred embodiments of the invention, it will be obvious to those skilled in the art that various changes and modifications can be made therein without departing from the scope of the invention defined by the appended claims.

We claim:

1. A molded article comprising:
a substrate comprising a thermoplastic alloy, the thermoplastic alloy including a polyester and a polycarbonate; and
an outer surface layer of a thermoplastic material disposed on at least a portion of the substrate, the thermoplastic material comprising a thermoplastic polyurethane and a styrenic thermoplastic elastomer.

2. The article of claim 1 wherein:
the styrenic thermoplastic elastomer is a styrenic block copolymer.

3. The article of claim 2 wherein:
the styrenic block copolymer is selected from the group consisting of styrene-butadiene-styrene copolymers, styrene-isoprene-styrene copolymers, styrene-ethylene/butylene-styrene copolymers, and styrene-ethylene/propylene-styrene copolymers.

4. The article of claim 2 wherein:
the styrenic block copolymer is selected from styrene-ethylene/butylene-styrene copolymers.

5. The article of claim 1 wherein:
the thermoplastic material consists essentially of a styrenic thermoplastic elastomer and a thermoplastic polyurethane.

6. The article of claim 1 wherein:
the thermoplastic material consists essentially of (i) a styrenic block copolymer selected from the group consisting of styrene-butadiene-styrene copolymers, styrene-isoprene-styrene copolymers, styrene-ethylene/butylene-styrene copolymers, and styrene-ethylene/propylene-styrene copolymers, and (ii) a thermoplastic polyurethane.

7. The article of claim 1 wherein:
the thermoplastic material consists essentially of (i) a styrene-ethylene/butylene-styrene copolymer, and (ii) a thermoplastic polyurethane.

8. The article of claim 1 wherein:
the polyester is the reaction product of a polyhydric alcohol and a polycarboxylic acid.

9. The article of claim 1 wherein:
the polyester is the reaction product of an alkanediol and terephthalic acid.

10. The article of claim 1 wherein:
the polyester is selected from polyethylene terephthalate and polybutylene terephthalate.

11. The article of claim 1 wherein:
the polyester is polybutylene terephthalate.

12. The article of claim 1 wherein:
the polycarbonate is a bisphenol-A polycarbonate.

13. The article of claim 1 wherein:
the polycarbonate is the reaction product of bisphenol-A and diphenyl carbonate.

14. The article of claim 1 wherein:
the thermoplastic alloy comprises polybutylene terephthalate and a bisphenol-A polycarbonate.

15. The article of claim 1 wherein:
the thermoplastic alloy consists essentially of a polyester and a polycarbonate.

16. The article of claim 1 wherein:
the thermoplastic alloy consists essentially of polybutylene terephthalate and a bisphenol-A polycarbonate.

17. The article of claim 1 wherein:
the layer of the thermoplastic has a hardness in the range of 40–70 Shore A.

18. The article of claim 1 wherein:
the substrate has a higher hardness than the layer.

19. A method of manufacturing an article, the method comprising:
  providing a substrate comprising a thermoplastic alloy including a polyester and a polycarbonate; and
  overmolding an outer surface layer of a thermoplastic material comprising a thermoplastic polyurethane and styrenic thermoplastic elastomer.

20. The method of claim 19 wherein:
the styrenic thermoplastic elastomer is a styrenic block copolymer.

21. The method of claim 20 wherein:
the styrenic block copolymer is selected from the group consisting of styrene-butadiene-styrene copolymers, styrene-isoprene-styrene copolymers, styrene-ethylene/butylene-styrene copolymers, and styrene-ethylene/propylene-styrene copolymers.

22. The method of claim 20 wherein:
the styrenic block copolymer is selected from styrene-ethylene/butylene-styrene copolymers.

23. The method of claim 19 wherein:
the polyester is the reaction product of a polyhydric alcohol and a polycarboxylic acid.

24. The method of claim 19 wherein:
the polyester is the reaction product of an alkanediol and terephthalic acid.

25. The method of claim 19 wherein:
the polyester is selected from polyethylene terephthalate and polybutylene terephthalate.

26. The method of claim 19 wherein:
the polyester is polybutylene terephthalate.

27. The method of claim 19 wherein:
the polycarbonate is a bisphenol-A polycarbonate.

28. The method of claim 19 wherein:
the polycarbonate is the reaction product of bisphenol-A and diphenyl carbonate.

29. The method of claim 19 wherein:
the thermoplastic alloy comprises polybutylene terephthalate and a bisphenol-A polycarbonate.

30. The method of claim 19 wherein:
the layer of the thermoplastic has a hardness in the range of 40–70 Shore A.

31. The method of claim 20 wherein:
the styrenic block copolymer is selected from the group consisting of styrene-butadiene-styrene copolymers, styrene-isoprene-styrene copolymers, styrene-ethylene/butylene-styrene copolymers, and styrene-ethylene/propylene-styrene copolymers,
the polyester is polybutylene terephthalate, and
the polycarbonate is a bisphenol-A polycarbonate.

32. The method of claim 19 wherein:
the substrate has a higher hardness than the layer.

33. A modular chain link for use in constructing a modular conveyor chain, the modular chain link comprising:
  a main body comprising a thermoplastic alloy including a polyester and a polycarbonate;
  a layer of a thermoplastic material disposed on at least a portion of the main body, the thermoplastic material comprising a thermoplastic polyurethane; and
  a plurality of spaced link ends projecting from opposite sides of the main body, the plurality of spaced link ends being adapted to couple with adjacent links for joining the modular chain link together with the adjacent links.

34. The modular chain link of claim 33 wherein:
the thermoplastic material is a thermoplastic elastomer alloy including a styrenic thermoplastic elastomer and the thermoplastic polyurethane.

35. The modular chain link of claim 34 wherein:
the styrenic thermoplastic elastomer is a styrenic block copolymer.

36. The modular chain link of claim 34 wherein:
the styrenic block copolymer is selected from the group consisting of styrene-butadiene-styrene copolymers, styrene-isoprene-styrene copolymers, styrene-ethylene/butylene-styrene copolymers, and styrene-ethylene/propylene-styrene copolymers.

37. The modular chain link of claim 34 wherein:
the styrenic block copolymer is selected from styrene-ethylene/butylene-styrene copolymers.

38. The modular chain link of claim 34 wherein:
the thermoplastic elastomer alloy consists essentially of a styrenic thermoplastic elastomer and a thermoplastic polyurethane.

39. The modular chain link of claim 34 wherein:
the thermoplastic elastomer alloy consists essentially of (i) a styrenic block copolymer selected from the group consisting of styrene-butadiene-styrene copolymers, styrene-isoprene-styrene copolymers, styrene-ethylene/butylene-styrene copolymers, and styrene-ethylene/propylene-styrene copolymers, and (ii) a thermoplastic polyurethane.

40. The modular chain link of claim 34 wherein:
the thermoplastic elastomer alloy consists essentially of (i) a styrene-ethylene/butylene-styrene copolymer, and (ii) a thermoplastic polyurethane.

41. The modular chain link of claim 33 wherein:
the polyester is the reaction product of a polyhydric alcohol and a polycarboxylic acid.

42. The modular chain link of claim 33 wherein:
the polyester is the reaction product of an alkanediol and terephthalic acid.

43. The modular chain link of claim 33 wherein:
the polyester is selected from polyethylene terephthalate and polybutylene terephthalate.

44. The modular chain link of claim 33 wherein:
the polyester is polybutylene terephthalate.

45. The modular chain link of claim 33 wherein:
the polycarbonate is bisphenol-A polycarbonate.

46. The modular chain link of claim 33 wherein:
the polycarbonate is the reaction product of bisphenol-A and diphenyl carbonate.

47. The modular chain link of claim 33 wherein:
the thermoplastic alloy comprises polybutylene terephthalate and a bisphenol-A polycarbonate.

48. The modular chain link of claim 33 wherein:
the thermoplastic alloy consists essentially of a polyester and a polycarbonate.

49. The modular chain link of claim 33 wherein:
the thermoplastic alloy consists essentially of polybutylene terephthalate and a bisphenol-A polycarbonate.

50. The modular chain link of claim 33 wherein:
the layer of the thermoplastic elastomer alloy has a hardness in the range of 40–70 Shore A.

51. The modular chain link of claim 33 wherein:
the body has a higher hardness than the layer.

* * * * *

UNITED STATES PATENT AND TRADEMARK OFFICE
CERTIFICATE OF CORRECTION

| | | |
|---|---|---|
| PATENT NO. | : 7,132,167 B2 | Page 1 of 1 |
| APPLICATION NO. | : 10/628932 | |
| DATED | : November 7, 2006 | |
| INVENTOR(S) | : Stebnicki et al. | |

It is certified that error appears in the above-identified patent and that said Letters Patent is hereby corrected as shown below:

Column 6, claim 17, line 64, "thermoplastic has" should be -- thermoplastic material has --.

Column 7, claim 19, lines 3-4, "alloy including" should be -- alloy, the thermoplastic alloy including --.

Signed and Sealed this

Ninth Day of January, 2007

JON W. DUDAS
*Director of the United States Patent and Trademark Office*